United States Patent [11] 3,607,428

[72] Inventor Joseph M. Marzolf
 Falls Church, Va.
[21] Appl. No. 819,875
[22] Filed Apr. 28, 1969
[45] Patented Sept. 21, 1971
[73] Assignee The United States of America as
 represented by the Secretary of the Navy

[54] LONG LIFE REGULATED SEA WATER BATTERY
 6 Claims, 1 Drawing Fig.
[52] U.S. Cl. .................................................. 136/100,
 136/178
[51] Int. Cl. ................................................... H01m 17/00
[50] Field of Search ......................................... 136/83,
 100, 178

[56] References Cited
 UNITED STATES PATENTS
 2,781,413 2/1957 Luening ........................ 136/100 X
 3,012,087 12/1961 Billiard et al. ................. 136/100 X
Primary Examiner—Donald L. Walton
Attorneys—R. S. Sciascia and A. L. Branning ABSTRACT: A sea water battery is housed within a container which is open to sea water at the bottom and which has a controllable valve for allowing gas to escape from the top. The opening and closing of the valve are actuated, respectively, by predetermined lower and upper battery voltage limits so as to control the amount of water within the container to thereby regulate the output voltage.

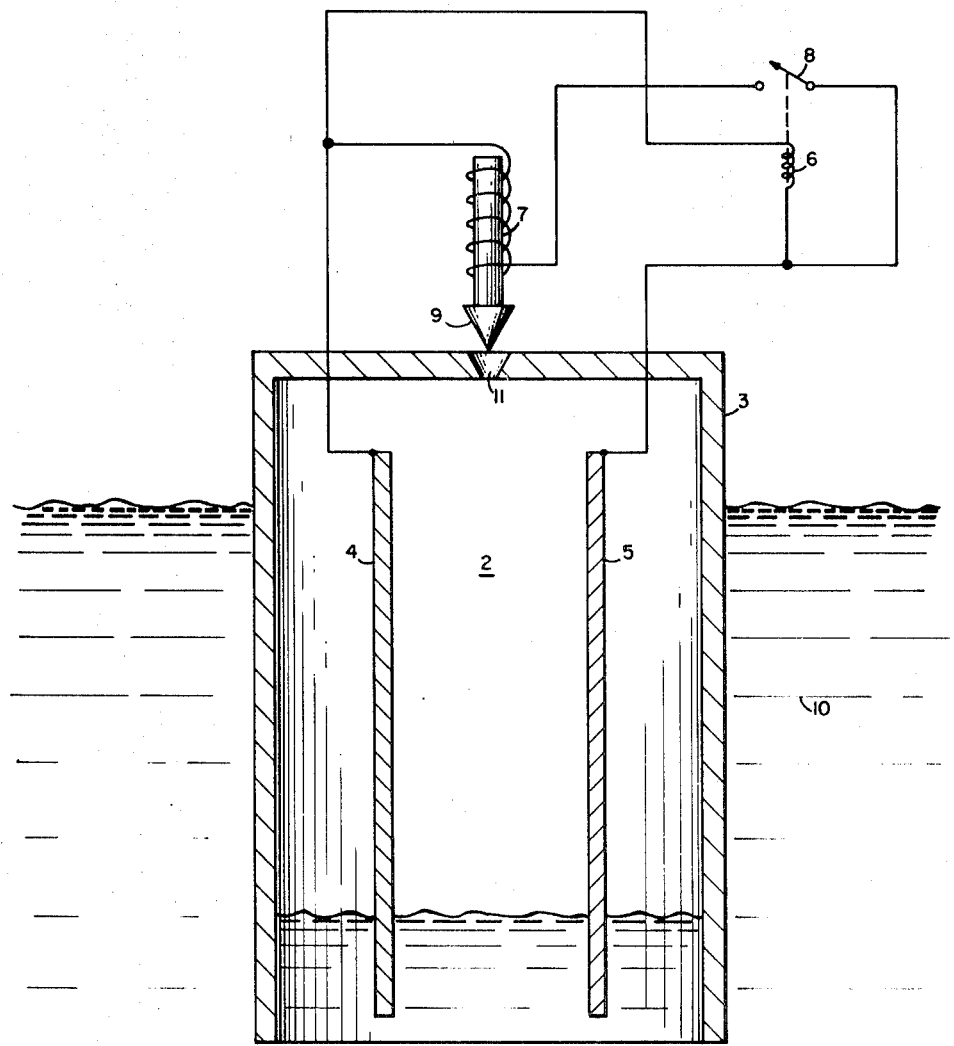
INVENTOR
JOSEPH M. MARZOLF
BY
ATTORNEY

LONG LIFE REGULATED SEA WATER BATTERY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The invention relates generally to a sea water battery or to those types of batteries in which the anode is consumed or eroded in the process of providing an output voltage. Such batteries commonly employ magnesium-base alloy metals. More specifically the invention provides a means for controlling the rate at which sea water is allowed to come in contact with the consumable battery anode thereby resulting in an extended life and an output voltage which can be maintained between preselected limits.

Magnesium anode sea water batteries provide an attractive power source for small, isolated marine installations because of their low cost and indefinite shelf life. The life of a battery, for a given load, depends upon the thickness of the magnesium anode which is consumed and the clogging that takes place between the electrodes. These factors impose a practical limitation on the life of the battery. Prior suggested techniques for overcoming these disadvantages have relied upon successive activation of conventional batteries in sequence. However the mechanical problems of maintaining seals intact over long periods of time and then mechanically opening them cause significant practical design problems which have not been adequately solved to date. It would therefore be highly desirable to have a battery which provides a means for automatically removing the clogging material from the vicinity of the electrodes and in addition allows for a gradual exposure of the anode surface to the sea water dependent on the output voltage of the battery.

OBJECTS OF THE INVENTION

It is therefore an object of the invention to increase the operating life of a sea water battery.

A further object is to control the output voltage of the battery within preselected limits.

A still further object is to provide a means for automatically removing from the battery-clogging material produced by the chemical action between the anode and the sea water.

Still another object is to provide a battery that is relatively inexpensive to fabricate and will operate dependably over long time periods.

SUMMARY OF THE INVENTION

These and other objects and advantages of the invention are realized by a battery placed within a bottomless container having a normally opened controllable valve located in the top part thereof. When the battery is immersed in the sea, water will enter the bottom of the container, actuating the battery and forcing the air out through the open valve. As the water rises, the active area of the battery increased and the terminal voltage rises. When this voltage increases to the operating point of the valve, it will close, thus trapping the remaining gas in the top of the container and preventing further flow of water into the bottom. With the valve sealed, the battery voltage will decrease slowly as the magnesium in contact with the water is eroded and also because the hydrogen produced in the reaction increases the pressure in the container and slowly forces the water out the bottom. When the voltage drops to the lower limit, the valve opens allowing some of the entrapped gas to escape and additional water to enter from the bottom. The activation of additional battery area causes the terminal voltage to rise until the valve closes and the cycle repeats.

Thus with each successive cycle some magnesium will be eroded from the bottom and the water will slowly rise activating new area. When the water reaches the top, after many cycles, the magnesium will be completely consumed and the battery life will end. During the life of the battery, the compounds normally causing clogging will be free to drop out the bottom and will not interfere with the operation of the battery.

BRIEF DESCRIPTION OF THE DRAWING

The invention will be described more fully in connection with the embodiment shown in the single drawing which illustrates the operating parts of the battery, container and valve mechanism.

DESCRIPTION OF THE PREFERRED EMBODIMENT

Referring to the drawing, the sea water battery constructed in accordance with the invention consists of a battery 2 having a consumable magnesium anode 4 and an inert metal, nickel for example, cathode 5 and affixed in a vertical position within a container 3 that is gastight on all sides and the top when valve 9 is closed, but open to the ambient sea water 10 at the bottom. An opening 11 is formed in the top of the container 3 which is capable of being sealed by a valve 9 operated directly from the battery voltage by a solenoid 7. The valve 9 is normally open but is designed to close when the voltage output from the battery rises to a first preselected value and to open when the battery voltage drops to a second preselected lower value. Solenoid 7 is operated by pilot relay 6 which opens and closes contacts 8. In this manner the output of the battery is maintained between selected limits by controlling the surface area of the anode in contact with the sea water.

The operation of the battery control system of the invention will now be explained in more detail. When the battery and its container are immersed in the sea, water will enter the bottom of the container 3 thereby initiating a chemical reaction which produces a potential difference between the electrodes 4 and 5. The chemical operation of a sea water battery is well known in the art and will not be explained in greater detail here. Contacts 8 are normally closed by means of pilot relay 6 thereby allowing the terminal voltage of the battery to be applied across solenoid 7 which keeps the valve 9 out of contact with the opening 11. The valve 9 is spring biased into closing engagement with the aperture 11 when the solenoid 7 is deenergized. The solenoid 7 however is selected to operate at a low battery voltage so that a short time after the device is immersed in sea water it becomes energized and holds the valve 9 out of engagement with the vent 11. Pilot relay 6 is chosen such that it opens the contacts 8 at a preselected first high voltage and closes them at a second preselected lower voltage. It is this action of the relay 6 which allows the battery voltage to be maintained between preselected limits. While the contacts 8 are closed air escapes from the container through vent 11 and past the valve 9. As the air escapes the sea water will rise in the container and the terminal voltage of the battery will increase to a point to actuate relay 6 and open the contacts 8. This action will deactivate the solenoid 7 and allow the spring-biased valve 9 to engage the opening 11 in the top of the container. Since no more air can escape through the opening the sea water ceases to rise in the container. In this state the battery voltage will decrease slowly due to the erosion of the magnesium anode and also because of the internal pressure of the container caused by the production of hydrogen gas as a result of the chemical reaction. When the battery voltage reaches the point at which relay 6 is deenergized the contacts 8 will close thereby allowing air to again escape from the container which results in the sea water rising into contact with a larger surface area of the anode and allowing the battery voltage to again rise, thereby repeating the aforedescribed cycle.

Thus with each successive cycle some magnesium will be eroded from the bottom and the water will slowly rise activating a new area. When the water reaches the top after many cycles, the magnesium will be completely consumed and the battery life will end. During the life of the battery, the compounds normally causing clogging will be free to drip out of the bottom and will not interfere with the operation of the battery. This removal of clogging material and gradual exposure of the consumable anode to the sea water makes it possible to design a battery having a lifetime many times greater than is possible with conventional type construction. It also provides a means of regulating the battery voltage between preselected limits.

The container can be made of a variety of materials so long as it is electrically insulated from the battery. The device can be made to float near the surface or alternately can sink below the surface depending upon the particular use to which the battery will be put. The limits within which the output voltage is maintained are purely a matter of design choice implemented by properly selecting the operating characteristics of the pilot relay. It is within the scope of the invention to employ several pairs of electrodes within a single container or alternately to use the container itself as an electrode. The mechanical relays shown in the drawing were used merely to demonstrate the principle of operation of the invention and may be easily replaced by solid state switching devices without departing from the principle of the invention. It is apparent also that the opening at the bottom of the container can take the form of a hole situated near rather than at the very bottom of the container, the same being true of the location of the aperture 11. The relays and other control means can be located either outside of or within the container in the water tight enclosure near the top of the container.

I claim:
1. A sea water battery comprising:
   a battery cell including electrodes requiring sea water to produce a voltage output;
   a container enclosing said cell but open to sea water through a lower part and including an aperture through an upper part thereof;
   means for regulating the surface area of said electrodes in contact with sea water, including a valve engaging said aperture and actuating means for continuously opening and closing said aperture to regulate said valve in response to said voltage output.
2. The battery of claim 1 wherein said actuating means is coupled to said valve in a manner to vent gases evolved from said battery cell at preselected voltage outputs.
3. The battery of claim 1 wherein said container is shaped to entrap gases in its upper part adjacent said aperture.
4. The battery of claim 1 wherein said actuating means includes at least two electrically responsive switches.
5. The battery of claim 1 wherein said electrodes are consumable by chemical reaction.
6. The battery of claim 4 wherein at least one of said switches is a solenoid.